PATENTED MAR 7 1972

3,647,301

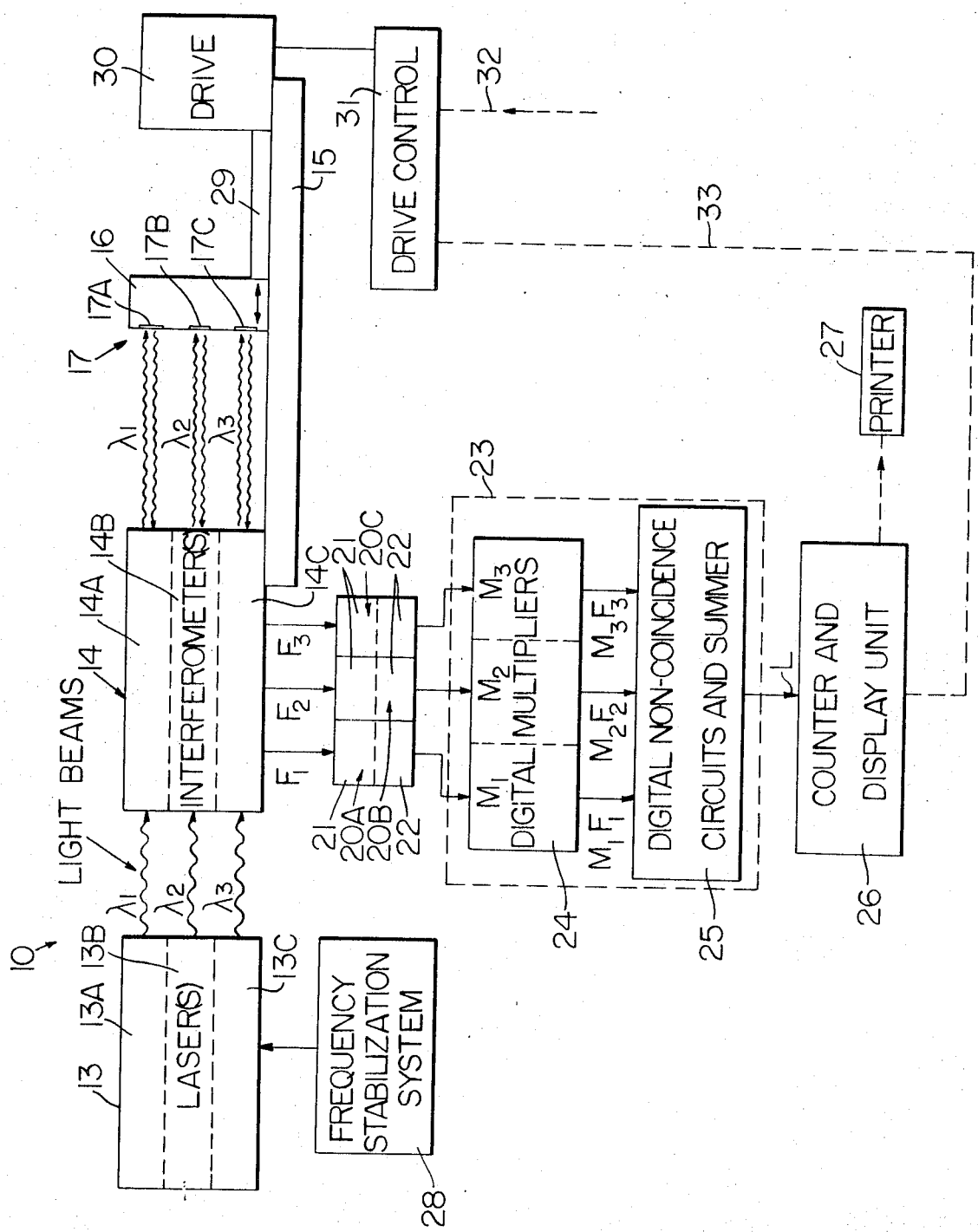

3,647,302

APPARATUS FOR AND METHOD OF OBTAINING PRECISION DIMENSIONAL MEASUREMENTS

BACKGROUND OF THE INVENTION

In providing high-precision measurements or movements using interferometers, variations in ambient conditions such as, variations in temperature, pressure, and relative humidity introduce dimensional errors which are unacceptable. Further, in apparatus and methods proposed heretofore, it has been very difficult, and often impossible, to correct for these variations in ambient conditions even in those instances where complicated and expensive equipment and techniques have been employed in an effort to control the ambient conditions within predetermined limits.

SUMMARY

This invention provides an improved apparatus for and method of providing precision dimensional measurements wherein a plurality of beams of electromagnetic energy such as beams of visible light, for example, having different known wavelengths in a vacuum are operatively associated with interferometer means having movable reflector means to provide an output fringe pattern for each beam characterized by alternating dark annulment and bright reenforcement fringes. The reflector means is moved causing movement of the fringes of each beam past an associated detector means which provides an electrical output signal in response to exposure to the bright reenforcement fringes as they move therepast whereby the electrical output signals represent a count of bright fringes of each beam. The electrical output signals from the detector means are scaled and summed to provide a combination signal which represents the actual distance moved by the reflector means and such distance has been inherently corrected for variations in ambient conditions.

Other details, uses, and advantages of this invention will become apparent as the following description of the exemplary embodiment thereof presented in the accompanying drawing proceeds.

BRIEF DESCRIPTION OF THE DRAWING

The accompanying drawing shows schematically an exemplary embodiment of this invention.

DESCRIPTION OF ILLUSTRATED EMBODIMENT

Figure 1:
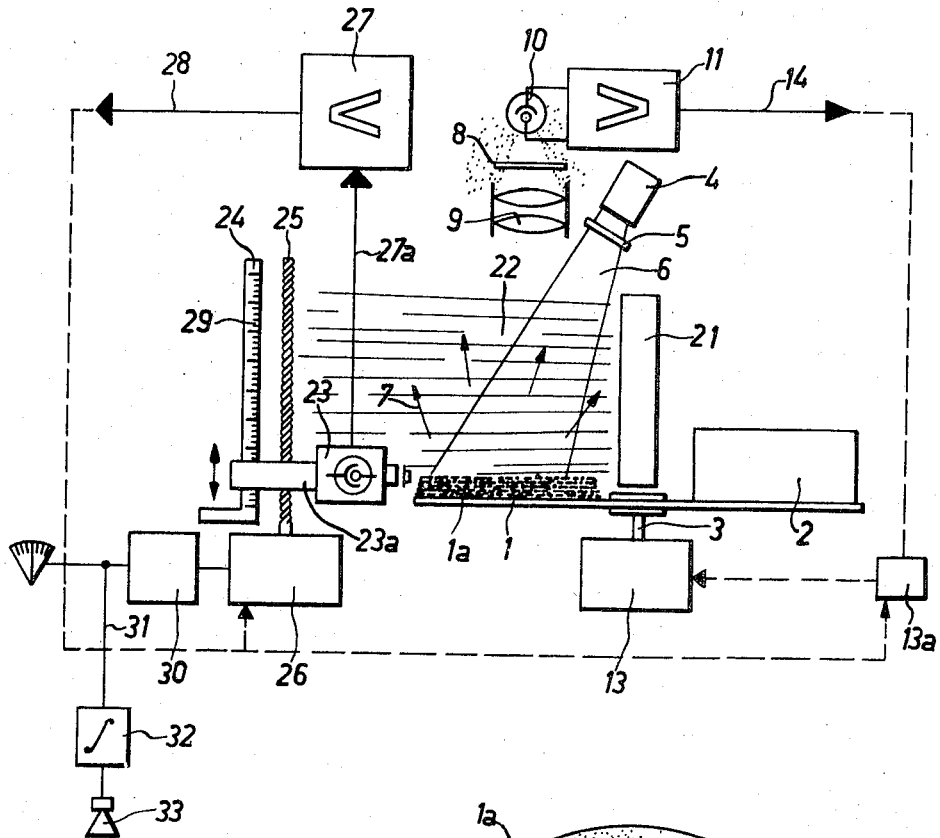
Figure 2:
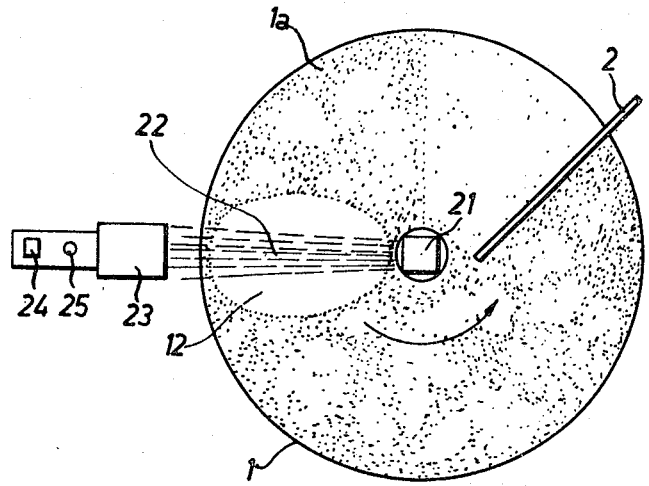

Reference is now made to the drawing which illustrates one exemplary embodiment of an apparatus and method of this invention which is designated generally by the reference numeral 10 and which is particularly adapted for providing precision dimensional measurements inherently corrected for variations in ambient conditions.

The apparatus 10 comprises means for providing a plurality of beams of electromagnetic energy and in this example such energy is in the form of light energy provided from an assembly 13 having a plurality of three lasers 13A, 13B, and 13C provided as an integral part thereof. Each laser 13A–C provides a beam of light having a different known wave length in a vacuum.

The apparatus 10 comprises interferometer means 14 which may be in the form of a single interferometer or a plurality of interferometers. In this example of the invention a plurality of three interferometers 14A, 14B, and 14C, basically of the Michelson type, are used to receive beams of light $\lambda 1$, $\lambda 2$, and $\lambda 3$ from lasers 13A, 13B, and 13C respectively. The interferometers 14A–C of this example are fixed on a horizontal way 15 of a precision machine and a slide assembly 16 is provided and supported on the way 15 for rectilinear movement toward and away from the interferometers 14A–C.

The slide assembly 16 has reflector means indicated generally at 17 which may be in the form of a single reflector or a plurality of reflectors; and, in this example of the invention, a plurality of three reflective elements 17A, 17B, and 17C are provided and comprise associated portions of interferometers 14A, 14B, and 14C respectively. Light from each laser is directed toward its associated interferometer, and, because the operation of the Michelson interferometer is well known, only a brief description will be presented.

In operation, an incoming beam of light is split into two beams by a beam splitter of the interferometer. One of the split beams is directed toward one reflective element fixed inside the interferometer and then reflected back to the beam splitter while the other split beam is directed toward the reflector means 17 on slide 16 and reflected back toward the beam splitter. The reflected beams recombine in a manner depending on the difference between the optical paths they have traveled to provide what will be referred to as an output fringe pattern. For ease of presentation in this disclosure of the invention, the output fringe patterns associated with interferometers 14A, 14B, and 14C will be referred to as fringe patterns or fringes $F_1$, $F_2$, and $F_3$.

Each fringe pattern $F_1$, $F_2$, or $F_3$ is characterized by alternating dark annulment fringes and bright reenforcement fringes. The dark annulment fringes are provided where two waves arrive at a given plane, such as a viewing screen, in phase opposition and the bright reenforcement fringes are provided where two waves arrive at such plane in phase agreement. Inasmuch as electromagnetic energy in the form of light energy is being used in this example, the dark fringes and bright fringes may be easily detected in a manner now to be described.

The apparatus 10 has detector means which in this example of the invention are in the form of photoelectric detector means or detectors 20A, 20B, and 20C operatively associating with fringes $F_1$, $F_2$, and $F_3$ respectively. The photoelectric detectors 20A, 20B, and 20C are of known construction and each has a portion 21 which detects bright fringes as each bright fringe is moved therepast and provides a corresponding electrical output signal. Each detector means 20A–C may also be provided with an electrical pulse generating portion 22 which may comprise suitable amplification means or amplifiers, squaring circuits, and related circuitry which provides a discrete independent pulse for each bright fringe and the discrete pulses thus provided may be readily utilized in a manner to be described in detail subsequently.

The apparatus 10 also has means for scaling and summing the output signals from the pulse generating circuits 22 of detector means 20A–C and such scaling and summing means is indicated by dotted lines as an assembly 23. The assembly 23 provides a combination signal which represents the actual distance moved from an initial position by the slide 16 and hence reflector means 17 and such distance is indicated by the letter L and is inherently corrected for variations in ambient conditions due to the unique utilization of a plurality of beams of electromagnetic energy each having a known wave length in a vacuum and each having a stable frequency.

The scaling and summing assembly 23 comprises a multiplier which may be in the form of a digital multiplier 24 and such multiplier is comprised of three multiplier units $M_1$, $M_2$, and $M_3$. The multiplier units $M_1$, $M_2$, and $M_3$ utilize the electrical pulses caused by fringes $F_1$, $F_2$, and $F_3$ and their associated detector means respectively to provide outputs from the multiplier 24 which may be considered outputs $M_1F_1$, $M_2F_2$, and $M_3F_3$, where the F's now represent the number of fringe count pulses from each pulse generating portion 22 and the M's represent the multiplying function of each multiplier. The electronic circuitry comprising each multiplier unit $M_1$, $M_2$, and $M_3$ changes the number of input pulses thereto by multiplying each pulse by a fixed value or constant by adding pulses to the pulse train if the constant is greater than one and subtracting pulses from the pulse train if the constant is less than one to thereby enable the individual pulse trains associated with each fringe pattern $F_1$, $F_2$, and $F_3$ to be summed algebraically with the other pulse trains. The digital multiplier units $M_1$, $M_2$, and $M_3$ may be of any suitable construction known in the art whereby it is not considered necessary to illustrate and describe the detailed electronic circuitry comprising each of such units.

The assembly 23 also comprises a summing device or summer 25 which includes digital noncoincidence circuits. The device 25 combines the electrical pulses provided from fringe patterns $F_1$, $F_2$, and $F_3$ and which are associated with beams of wavelengths $\lambda 1$, $\lambda 2$, and $\lambda 3$ respectively to provide a combined pulse train from the device 25 which is representative of the movement of the slide assembly 16 and hence the reflective surfaces 17A–C on the horizontal way 15. The pulse train representing the length is introduced into a counter and display unit 26 which may include electronic devices providing a numerical display in units of length and decimals thereof having accuracies generally of the order of one-millionth of an inch or greater. The counter and display unit 26 may be of any type well known in the art and hence the operation thereof will not be described in detail.

The display unit 26 may also be operatively connected to a suitable electronic device 27 which provides permanent-type automatic recording of each final position to which the slide assembly 16 has been moved and such device may be in the form of a printer such as an automatic typewriter.

The digital noncoincidence circuits of device 25 are of known construction and use standard electronic devices which introduce appropriate time delays into the various pulses of the three pulse trains $M_1F_1$, $M_2F_2$, and $M_3F_3$ to assure all pulses are counted by assuring that a plurality of pulses are not introduced into the summer in a simultaneous manner.

The apparatus 10 is preferably provided with a frequency stabilization system 28 for stabilizing the frequency of the light beams $\lambda 1$, $\lambda 2$, and $\lambda 3$, from the lasers 13A, 13B, and 13C respectively. The frequency stabilization system may be of any suitable construction and may employ a carrier-type electronic servo loop which automatically adjusts the length between opposed mirrors defining the laser cavity of each laser 13A–C so that the power output of each laser is a minima or a maxima depending upon the active media. Therefore, the frequency stabilization system in essence assures that a beam is provided for each laser which has a known wavelength in a vacuum which corresponds to a precisely controlled stable frequency.

The frequency stabilization system 28 of this example is shown as a single box for ease of presentation. However, it will be appreciated that a plurality of three separate systems may also be provided, if desired, with each system associating with a particular laser 13A–C.

The apparatus 10 is particularly adapted to be used to control a slide assembly such as slide 16 on a precision way 15 of a machine as previously mentioned and the machine of this example has a driving mechanism 29 which is operatively connected between the slide assembly 16 and a drive 30. The drive 30 has a control unit 31 operatively connected thereto and the control unit 31 may be of the type wherein a position input is provided by either manual means or by suitable automatic means causing a corresponding movement of the slide assembly 16. The position input may be provided to the drive control unit 31 as indicated by the input arrow at 32 from a suitable input mechanism such as by a punched paper tape, punched card, magnetic tape, etc., or manually whereby the drive 30 is actuated in accordance with the position input command at 32. The drive 30 may also be a manual system such as a handwheel in which case an operator provides feedback.

The unique apparatus 10 of this invention then precisely determines the actual movement as compared with the input signal at 32 and a feedback signal is provided from the unit 26 through a line 33 to the drive control unit 31.

The drive control unit 31 has electronic means provided therein which may be of known construction and enable modification of the input signal 32 as required to precisely reposition the slide assembly 16, if required, and as determined by the apparatus 10 of this invention.

The various components of the apparatus 10, such as the lasers 13A–13C and interferometers 14A–14C with their associated reflectors 17A–17C, respectively, are generally arranged in spaced relation. Further, the various components are normally used under conditions where they are surrounded by air, either in a controlled laboratory environment or in a production environment, depending upon the machine on which the apparatus 10 is being employed. However, it is well known that there are variations in the temperature, pressure, and relative humidity of the ambient air and such variations cause associated variations in the fringe counts $F_1$, $F_2$, and $F_3$ which are further influenced by the distance that the associated beams $\lambda 1$, $\lambda 2$, and $\lambda 3$ travel.

The apparatus and method of this invention utilize a plurality of frequencies, three in this exemplary presentation of the invention, which eliminate the need to make separate index of refraction compensations. By using three beams, each having a different known wavelength in a vacuum, and a precisely controlled frequency, automatic compensation is made for the three variables of ambient temperature, pressure, and relative humidity, which most dramatically influence the precision results. Further, even though these variables are constantly changing, precise compensation is made at all times during normal operation of the associated precision machine using system 10.

In accordance with this invention three simultaneous equations are set up having three unknowns and these equations are solved simultaneously in the scaling and summing device or assembly 23 so as to provide an output in the form of a train of discrete electrical pulses from the device 23, indicated at L, and which represent the length traveled by assembly 16 from the time a signal is fed to drive 30 to cause any particular movement until the assembly 16 is stopped. Thus, the length L is provided by the device 23 and displayed on unit 26 without any knowledge of the environment and without being concerned with changes therein whereby the apparatus and method 10 routinely provide measurement accuracies heretofore considered impractical and generally of the order of one-millionth of an inch accuracy for each inch moved even over extended movements of several yards.

To assure that bidirectional movement of the slide assembly, i.e., both toward and away from the interferometers 14A–C may be detected, any suitable known means may be provided as a part of the detector means 20A–C. It is well known that the direction of movement of a fringe pattern such as $F_1$, $F_2$, or $F_3$ reverses when the direction of movement of the reflective surfaces 17A–17C is reversed. By using a pair of photoelectric detectors, for example, in each detector portion 21 of a given detector means 20A–C and spacing the two detectors in areas which have light density variations 90° out of phase, the electrical output from the pair of photoelectric detectors in each detector means 20A, 20B, or 20C will thus have a quadrature phase relationship. It is then a simple matter to determine the direction and distance that drive 30 moves slide 16 and its reflectors 17A–C using suitable electronic circuitry.

To provide a better understanding of the manner in which the apparatus and method of this invention provide precision dimensional measurements, a presentation of the analytical solution provided by device 23 will now be made. The basic equation for length measurement by counting of interferometer fringes is $$L = C\lambda_e F = C\lambda_v F / N_e$$

where
$C$ = a constant of the interferometer which depends on the optical configuration,
$\lambda_e$ = the wavelength of the light source being used in the air of the interferometer path with subscript $e$ referring to environmental conditions,
$F$ = the number of fringes counted which the interferometer path changes by the length $L$,
$\lambda_v$ = the wavelength of the light source in vacuum with subscript $v$ referring to vacuum conditions, and
$N_e$ = the index of refraction of the air in the interferometer path ($N_e \lambda_e = \lambda_v$).

$N_e$ is given by $$Ne = 1 + \left\{\frac{Ns-1}{720.8826}\right\} \left\{\frac{p[1+(1.049-0.0157t)p10^{-6}]}{1+0.003661t}\right\}$$
$$- \left\{0.0624 - \frac{0.000680}{\lambda_v^2}\right\} \left\{\frac{f10^{-6}}{1+0.003661t}\right\} \quad (2)$$

where
$Ns$ = the index of refraction of spectroscopic standard air ($t$=15 C., $p$=760 mm. Hg, $CO_2$ content = 0.03 percent and $f$=0) for light of vacuum wavelength $\lambda v$, and is given by $$Ns = 1 + 6432.8 \times 10^{-8} + \frac{2949810 \times 10^{-8}}{146 - 1/\lambda_v^2} + \frac{25540 \times 10^{-8}}{41 - 1/\lambda_v^2} \quad (3)$$

and where
$\lambda v$ is given in microns ($10^{-6}$ meters),
$p$ = barometric pressure in mm. Hg,
$t$ = temperature in ° C., and
$f$ = water vapor pressure in the air in mm. Hg.

In order to simplify the expressions and to avoid confusion, it should be noted that $Ns$ is a function of $\lambda v$ alone so that it is desirable to set $$W(\lambda v) = \frac{Ns - 1}{720.8826} \quad (4)$$

It is also desirable to set $$X(p, t) = \frac{p[1+(1.049-0.0157t)p10^{-6}]}{1+0.003661t} \quad (5)$$

which is a function of $p$ and $t$ alone, and similarly $$Y(\lambda v) = 0.0624 - \frac{0.000680}{\lambda_v^2} \quad (6)$$

and $$Z(f, t) = \frac{f10^{-6}}{1+0.003661t} \quad (7)$$

so that Equation (2) may be rewritten as $$Ne = 1 + W(\lambda v)X(p,t) - Y(\lambda v)Z(f,t) \quad (8)$$

Note that $W(\lambda v)$ and $Y(\lambda v)$ depend only on the vacuum wavelength emitted by the source being used, and $X(p,t)$ and $Z(f,t)$ are functions of the environment alone. If environmental conditions are known, and measurements are made with a known light source, then $Ne$ is readily calculated and Equation (1) may be used to calculate a length $L$ traversed by a moving reflector of an interferometer. This is what was done with previous apparatus and methods. But monitoring the environment and making the calculations (even if completely automatic) is inconvenient, very costly, and only correct if the air in the interferometer path remains uniform.

However, three light sources may be fed to suitable interferometer means with the light sources having vacuum wavelengths $\lambda v_1$, $\lambda v_2$, and $\lambda v_3$ so that three interference fringe patterns or fringe counts $F_1$, $F_2$, and $F_3$ are provided of which alternating ones of these fringes may be counted whereby $$L = C\lambda v_1 F_1/Ne_1 = C\lambda v_2 F_2/Ne_2 = C\lambda v_3 F_3/Ne_3 \quad (9)$$

By using Equation (8), it is possible to obtain a set of three linear equations having three unknowns:

$$\frac{C\lambda v_1 F_1}{L} = 1 + W_1 X - Y_1 Z = Ne_1$$

$$\frac{C\lambda v_2 F_2}{L} = 1 + W_2 X - Y_2 Z = Ne_2 \quad (10)$$

$$\frac{C\lambda v_3 F_3}{L} = 1 + W_3 X - Y_3 Z = Ne_3$$

Where an obvious simplification of the symbolism has been made. This set of equations is readily solved for $L$ (and also $X$ and $Z$ if desired).

$$\frac{1}{L} = \frac{\begin{vmatrix} 1 & -W_1 & Y_1 \\ 1 & -W_2 & Y_2 \\ 1 & -W_3 & Y_3 \end{vmatrix}}{\begin{vmatrix} C\lambda v_1 F_1 & -W_1 & Y_1 \\ C\lambda v_2 F_2 & -W_2 & Y_2 \\ C\lambda v_3 F_3 & -W_3 & Y_3 \end{vmatrix}}$$

and so $$L = \frac{C\left\{\begin{array}{l}\lambda v_1 F_1[W_3 Y_2 - W_2 Y_3] \\ + \lambda v_2 F_2[W_1 Y_3 - W_3 Y_1] + \lambda v_3 F_3[W_2 Y_1 - W_1 Y_2]\end{array}\right\}}{W_3 Y_2 - W_2 Y_3 + W_1 Y_3 - W_3 Y_1 + W_2 Y_1 - W_1 Y_2} \quad (12)$$

By setting $D = W_3 Y_2 - W_2 Y_3 + W_1 Y_3 - W_3 Y_1 + W_2 Y_1 - W_1 Y_2$ we obtain $$L = \frac{\left\{\begin{array}{l}C\lambda v_1 F_1[W_3 Y_2 - W_2 Y_3] \\ + \lambda v_2 F_2[W_1 Y_3 - W_3 Y_1] + \lambda v_3 F_3[W_2 Y_1 - W_1 Y_2]\end{array}\right\}}{D} \quad (13)$$

All terms of expression 12 are either functions of the three vacuum wavelengths or the interferometers configuration, or are the fringe counts from the interferometer. From this expression $L$ may be calculated without any knowledge of the environment. It will further average over the entire path since the $F$'s depend on the environment in the entire path.

Now let $$M_1 = \frac{C\lambda v_1[W_3 Y_2 - W_2 Y_3]}{D}$$

$$M_2 = \frac{C\lambda v_2[W_1 Y_3 - W_3 Y_1]}{D}$$

$$M_3 = \frac{C\lambda v_3[W_2 Y_1 - W_1 Y_2]}{D}$$

Substituting $M_1$, $M_2$, and $M_3$ in Equation (13), the following expression is obtained $$L = M_1 F_1 + M_2 F_2 + M_3 F_3$$

In essence, the device 23 electronically provides the value $L$ therefrom as shown in the drawing and as presented in the above expression.

In this example of the invention a plurality of three interferometers have been used with each interferometer being operatively associated with a known wavelength to provide the desired results. However, it will be appreciated that a single interferometer may be used, together with suitable dispersing means such as a prism, for example, or a plurality of beam splitters wherein the first beam splitter could be suitably coated to reflect one wave of known length and pass the other wave lengths therethrough, a second beam splitter could be coated to reflect the second wave of known length and pass others therethrough and suitable reflector means would be provided to reflect a third wave of known length.

Any suitable frequency stabilized laser may be used with the apparatus and method 10. Good results may be obtained using He–Ne lasers with light energy in the visible range. However, it will be appreciated that the apparatus and method of this invention may be employed utilizing beams of electromagnetic energy having wavelengths ranging from radio waves of long length, through the visible light spectrum, and including gamma rays of short length. In this disclosure of the invention a plurality of three beams of electromagnetic energy each having different known wavelengths in a vacuum have been utilized; however, it will be appreciated that a plurality of only two beams having different known wavelengths may be used provided that the apparatus or method 10 is employed in an environment wherein two of the three variables, preferably relative humidity or temperature is precisely controlled and held constant whereby only pressure is likely to change. Thus, the teachings of this invention are fully applicable to provide similar results when two beams are used and the apparatus and method employ means providing the simultaneous solution of two equations having two unknowns in a similar manner as three equations and three unknowns.

In the next preceding paragraph it has been mentioned that temperature or relative humidity may be precisely controlled. It has been found that it is very difficult to control ambient pressure with sufficient accuracy to assure precision results. Thus, changes in pressure produce changes of $4 \times 10^{-7}$ inch/inch of length moved/mm.Hg. By contrast, temperature changes affect the ultimate length $9 \times 10^{-7}$ inch/inch of length moved/° C. and temperature is readily controllable, and 10 percent changes in relative humidity produce changes of $1 \times 10^{-7}$ inch/inch of length moved which is very small, all calculated at a wavelength of 633 nanometers.

In this disclosure of the invention light source means in the form of a plurality of three lasers 13A–C have been provided; however, it will be appreciated that in some applications a single laser may be employed to provide a plurality of light beams which are utilized in a similar manner as described earlier.

In this example of the invention reference has been made to the utilization of the apparatus and method 10 in association with a machine and the word machine is intended to cover any machine where precise positioning of operating devices is required or where precise measurements are required. Such machines include (among many others) cutting machines, assembly machines, measuring machines, drafting machines, etc., and regardless of whether such machines are completely automatically, semiautomatically, or primarily manually operated. It will also be appreciated that the position input such as the position input 32 provided into the drive control 31 may be from special or general purpose computers.

While present exemplary embodiments of this invention, and methods of practicing the same, have been illustrated and described, it will be recognized that this invention may be otherwise variously embodied and practiced within the scope of the following claims.

What is claimed is:

1. An apparatus for obtaining precision dimensional measurement comprising, means providing a plurality of parallel beams of electromagnetic energy each having a different known wavelength in a vacuum, interferometer means cooperating with said providing means, said interferometer means comprising fixed and movable means with said movable means including reflector means arranged in a single plane and supported for reciprocating rectilinear movement parallel to said parallel beams to provide an output fringe pattern for each beam characterized by alternating annulment fringes and reenforcement fringes, a plurality of detector means each providing an electrical output signal in response to exposure to alternate ones of said fringes, means moving said reflector means causing a cyclic variation of a plurality of fringes of each beam past its associated detector means and the provision of a plurality of electrical output signals representing a count of said alternate fringes, and means scaling and summing said plurality of output signals to provide a combination signal which represents the actual distance moved by said reflector means inherently corrected for variations in ambient conditions.

2. An apparatus as set forth in claim 1 and further comprising a frequency stabilization system for precisely controlling the frequency of each of said beams of electromagnetic energy.

3. An apparatus as set forth in claim 1 in which said providing means comprises a plurality of lasers.

4. An apparatus for obtaining precision dimensional measurements comprising, means providing a plurality of parallel light beams each having a different known wavelength in a vacuum, interferometer means cooperating with said providing means, said interferometer means comprising fixed and movable means with said movable means including reflector means arranged in a single plane and supported for reciprocating rectilinear movement parallel to said parallel beams to provide an output fringe pattern for each beam characterized by alternating dark annulment fringes and bright reenforcement fringes, a plurality of detector means each providing an electrical output signal in response to exposure to a bright fringe, means moving said reflector means causing movement of a plurality of bright fringes of each light beam past its associated detector means and the provision of a plurality of electrical output signals representing a count of said bright fringes, and means scaling and summing said plurality of output signals from said detector means to provide a combination signal which represents the actual distance moved by said reflector means inherently corrected for variations in ambient conditions.

5. An apparatus as set forth in claim 4 in which said providing means comprises a plurality of lasers.

6. An apparatus as set forth in claim 5 and further comprising a frequency stabilization system which assures that a light beam from each laser has a precisely controlled frequency.

7. An apparatus as set forth in claim 4 in which said scaling and summing means comprises a plurality of digital multipliers.

8. An apparatus as set forth in claim 4 in which said scaling and summing means comprises a plurality of digital multipliers cooperating with digital noncoincidence circuits and a summer to provide said actual distance.

9. An apparatus as set forth in claim 8 in which said interferometer means comprises a plurality of interferometers basically of the Michelson type.

10. An apparatus as set forth in claim 4 in which said providing means comprises a plurality of lasers, said interferometer means comprises a plurality of interferometers corresponding in number to said plurality of lasers, and said reflector means includes reflective surface portions associating with each of said interferometers.

11. An apparatus as set forth in claim 10 in which each of said plurality of detector means comprises a photoelectric detector and further comprising an electrical pulse generating portion associated with each photoelectric detector.

12. An apparatus as set forth in claim 4 in combination with a machine having a machine way and having a slide assembly supported for movement on said way, said interferometer means having its fixed means fastened at a fixed position on said way and having said reflector means fixed on said slide assembly, and said moving means comprising a drive for moving said slide assembly.

13. An apparatus as set forth in claim 12 and further comprising a drive control for said drive and feedback means operatively connected between said positioning apparatus and said drive control to modify the movement of said slide assembly as determined by said positioning apparatus.

14. A method of obtaining precision dimensional measurements comprising, providing a plurality of parallel beams of electromagnetic energy each having a different known wavelength in a vacuum, operatively associating said beams with interferometer means having fixed and movable means with said movable means including reflector means arranged in a single plane and supported for reciprocating rectilinear movement parallel to said parallel beams to provide an output fringe pattern for each beam characterized by alternating annulment fringes and reenforcement fringes, fixing a plurality of detector means in position to detect movement of associated fringes therepast, each of said detector means providing an electrical output signal as each alternate fringe moves therepast, moving said reflector means causing movement of a plurality of fringes of each beam past its associated detector means and the provision of a corresponding plurality of electrical output signals representing counts of said alternate fringes, and scaling and summing said plurality of output signals to provide a combination signal which represents the actual distance moved by said reflector means inherently corrected for variations in ambient conditions.

15. A method as set forth in claim 14 and comprising the further step of precisely controlling the frequency of each of said beams.

16. A method as set forth in claim 14 in which said providing step comprises providing a plurality of beams of light energy using a corresponding plurality of lasers so that said annulment fringes comprise dark fringes and said reenforcement fringes comprise bright fringes.

17. A method as set forth in claim 16 in which said fixing step comprises fixing a plurality of photoelectric detectors in position to detect movement of associated bright fringes therepast.

18. A method as set forth in claim 16 in which said operatively associating step comprises operatively associating said beams with said interferometer means in the form of a plurality of interferometers corresponding in number to said plurality of beams, each of said interferometers having fixed and movable means with said movable means including said reflector means having a reflective surface.

19. A method as set forth in claim 16 in which said plurality of beams consist of a plurality of three beams, and said scaling and summing step comprises simultaneously solving three equations having three unknowns of ambient temperature, ambient pressure, and ambient relative humidity to provide said actual distance.

20. A method as set forth in claim 19 in which said step of simultaneously solving includes solving the final equation $L \times M_1 F_1 + M_2 F_2 + M_3 F_3$ wherein $L$ defines said actual distance.

* * * * *